(12) United States Patent
Lee et al.

(10) Patent No.: US 7,450,755 B2
(45) Date of Patent: Nov. 11, 2008

(54) METHOD AND APPARATUS TO GENERATE IMAGE FORMING DATA USING COLOR PROFILE MATCHING IMAGE PROCESSING APPLICATION

(75) Inventors: Jae-pyoung Lee, Suwon-si (KR); Bong-gi Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 856 days.

(21) Appl. No.: 11/032,177

(22) Filed: Jan. 11, 2005

(65) Prior Publication Data

US 2005/0169525 A1    Aug. 4, 2005

(30) Foreign Application Priority Data

Jan. 29, 2004  (KR) .................. 10-2004-0005748

(51) Int. Cl.
*G06K 9/00*     (2006.01)
*G03F 3/08*     (2006.01)

(52) U.S. Cl. ....................................... 382/167
(58) Field of Classification Search ............... 382/162, 382/164, 165, 167, 305; 358/1.9, 515, 518, 358/520, 538; 345/589, 600–604
See application file for complete search history.

(56) References Cited

U.S. PATENT DOCUMENTS

| | | | |
|---|---|---|---|
| 5,710,827 A * | 1/1998 | Perumal et al. ............. | 382/167 |
| 5,872,895 A | 2/1999 | Zandee et al. | |
| 6,115,133 A | 9/2000 | Watanabe | |
| 6,307,961 B1 * | 10/2001 | Balonon-Rosen et al. ... | 382/167 |
| 6,377,366 B1 * | 4/2002 | Usami ........................ | 358/520 |

(Continued)

FOREIGN PATENT DOCUMENTS

EP            665676 A2        1/1995

(Continued)

OTHER PUBLICATIONS

Korean Office Action dated Dec. 15, 2006 in KR Application 2004-5748.

*Primary Examiner*—Amir Alavi
(74) *Attorney, Agent, or Firm*—Stanzione & Kim, LLP

(57) ABSTRACT

A method and apparatus to generate image forming data using a color profile matching an image processing application. The method includes generating a color profile matching table listing color profiles matching corresponding ones of image processing applications, in response to a request to form an image by a specific image processing application, determining whether or not a specific color profile matching the specific image processing application is listed in the color profile matching table, and if the specific color profile matching the specific image processing application is listed in the color profile matching table, generating the image forming data in accordance with the specific color profile, wherein the image forming data is transmitted to an image forming apparatus to form an image. Accordingly, since an optimized color profile matching an image processing application is provided, it is possible to solve a problem in that a user must manually adjust a color profile to the changing image processing application to optimally print an image. In particular, it is possible for a user, who is not accustomed to a computer, to easily manage a color profile. In addition, it is possible to obtain an optimized image even in a case where the image processing applications are changed.

21 Claims, 3 Drawing Sheets

U.S. PATENT DOCUMENTS

| | | | |
|---|---|---|---|
| 6,603,879 B2 * | 8/2003 | Haikin et al. | 382/167 |
| 6,925,205 B2 * | 8/2005 | Leedham et al. | 382/167 |
| 7,164,498 B2 * | 1/2007 | Van Bael | 358/1.9 |
| 7,339,700 B2 * | 3/2008 | Ohga et al. | 358/1.9 |
| 7,382,379 B1 * | 6/2008 | Edge et al. | 345/600 |
| 2005/0169525 A1 * | 8/2005 | Lee et al. | 382/167 |

FOREIGN PATENT DOCUMENTS

| | | |
|---|---|---|
| JP | 07-107312 | 4/1995 |
| JP | 07-222009 | 8/1995 |
| JP | 09-193477 | 7/1997 |
| JP | 10-155094 | 6/1998 |
| JP | 2000-255034 | 9/2000 |
| JP | 2002-342048 | 11/2002 |

* cited by examiner

METHOD AND APPARATUS TO GENERATE IMAGE FORMING DATA USING COLOR PROFILE MATCHING IMAGE PROCESSING APPLICATION

CROSS-REFERENCE TO RELATED APPLICATIONS

This application claims the priority of Korean Patent Application No. 2004-5748, filed on Jan. 29, 2004, in the Korean Intellectual Property Office, the disclosure of which is incorporated herein in its entirety by reference.

BACKGROUND OF THE INVENTION

1. Field of the Invention

The present general inventive concept relates to a method and apparatus to generate image forming data used in an image forming apparatus, and more particularly, a method and apparatus to generate image forming data using a color profile matching an image processing application.

2. Description of the Related Art

Image forming apparatuses include printers for printing an image, scanners for printing an image, and multifunction printers having functions of printing, scanning, photocopying, faxing, and so on.

In general, in order to control an image forming apparatus to perform an image forming process (for example, printing and scanning), a computer connected to the image forming apparatus utilizes an image processing application and an image forming driver. The image processing application including, for example, MS word® and PhotoShop®, is used to make an image document. The image forming driver has a function of generating image forming data, or an image command with which the image forming apparatus analyzes the image document. The image forming apparatus comprises a video controller for analyzing the image forming data to generate a bitmap image, and an engine controller for transmitting the bitmap image to an imaging unit.

In a case where a printer is used as an image forming apparatus, an image document is made by an image forming application, and then an image of the image document is printed by the printer. More specifically, the image forming application transmits the image to a printer driver. The printer driver generates image forming data or an image command based on the image transmitted from the image forming application. Here, the image forming data is generated in such a format that it can be analyzed by a video controller of the printer. The image forming data generated by the printer driver is transmitted to the video controller through a serial or parallel input/output unit or a network. The image forming data is converted into bitmap image data at a program ROM of the video controller, so that a bitmap image can be obtained. The bitmap image is transmitted through an engine controller to an imaging unit of the printer. The imaging unit of the printer prints the bitmap image on a printing medium.

Conventionally, a user adjusts colors of the image by using a color management function, which is registered in the printer. More specifically, the user adjusts the colors by using options of the color management function. The options include an image color matching (ICM) profile and an international color consortium (ICC) profile. The ICM profile comprises color systems associated with image processing applications or peripheral apparatuses such as color printers and scanners. The ICM profile is used to match a color system of an image processing application or a peripheral apparatus with a color system of another image processing application or another peripheral apparatus. In addition, there is an ICC profile standard to define color reproduction in peripheral apparatuses. Manufacturers of image forming apparatuses prepare color reproduction profiles in accordance with the ICC profile standard. The ICC profile is a general purpose color profile according to the ICC profile standard.

With respect to the color profile, there is a problem in that a user must manually adjust a color profile to the corresponding image processing application to optimally print an image. In particular, the color adjustment process places a burden on a user who is not accustomed to a computer.

SUMMARY OF THE INVENTION

The present general inventive concept provides a method of generating image forming data using a color profile matching an image processing application.

The present general inventive concept also provides an apparatus to generate image forming data using a color profile matching an image processing application.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of generating image forming data using color profiles matching corresponding ones of image processing applications to perform image processes, the method comprising generating a color profile matching table listing the color profiles matching the image processing applications, in response to a request to form an image by a specific image processing application, determining whether or not a specific color profile matching the predetermined image processing application is listed in the color profile matching table, and if the specific color profile matching the predetermined image processing application is listed in the color profile matching table, generating the image forming data in accordance with the specific color profile, wherein the image forming data is transmitted to an image forming apparatus to form the image.

The foregoing and/or other aspects and advantages of the present general inventive concept may also be achieved by providing an apparatus to generate image forming data using color profiles matching corresponding ones of image processing applications to perform image processes, the apparatus comprising a matching table generation unit which generates color profile matching table listing the color profiles matching corresponding ones of the image processing applications, a color profile determination unit which, in response to a request to form an image by a predetermined image processing application, determines whether or not a specific color profile matching the predetermined image processing application is listed in the color profile matching table, and a image forming data generation unit which, if the specific color profile matching the predetermined image processing application is listed in the color profile matching table, generates the image forming data in accordance with the specific color profile, wherein the image forming data is transmitted to an image forming apparatus to form the image.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
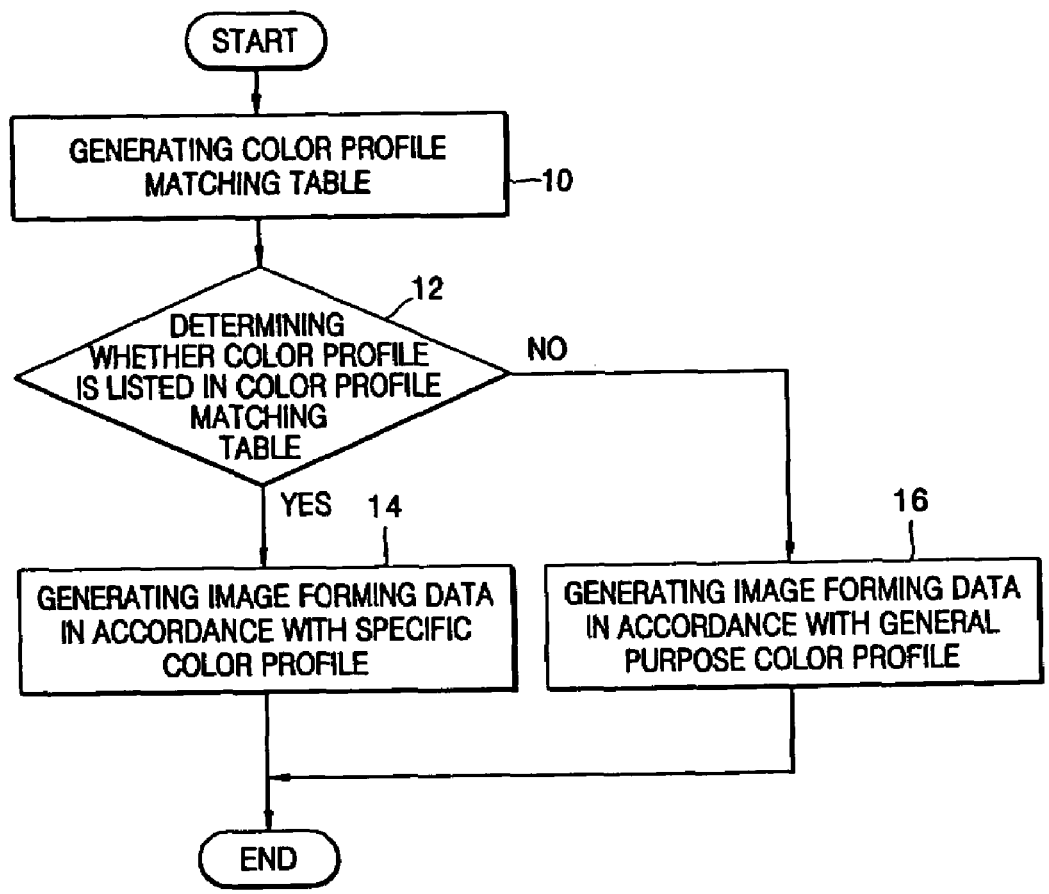
FIG. 1 is a flowchart of a method of generating image forming data using a color profile matching an image processing application according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An apparatus and method of generating image forming data using a color profile matching an image processing application according to an embodiment of the present general inventive concept will be described in detail with reference to the accompanying drawings.

FIG. 1 is a flowchart of a method of generating image forming data using a color profile matching an image processing application according to an embodiment of the present general inventive concept. In this method, a predetermined color profile matching the image processing application is obtained from a color profile matching table, and an image is formed using the predetermined color profile (operations 10~16).

Firstly, a color profile matching table is generated (operation 10). The color profile matching table lists color profiles matching corresponding ones of image processing applications.

Figure 2:
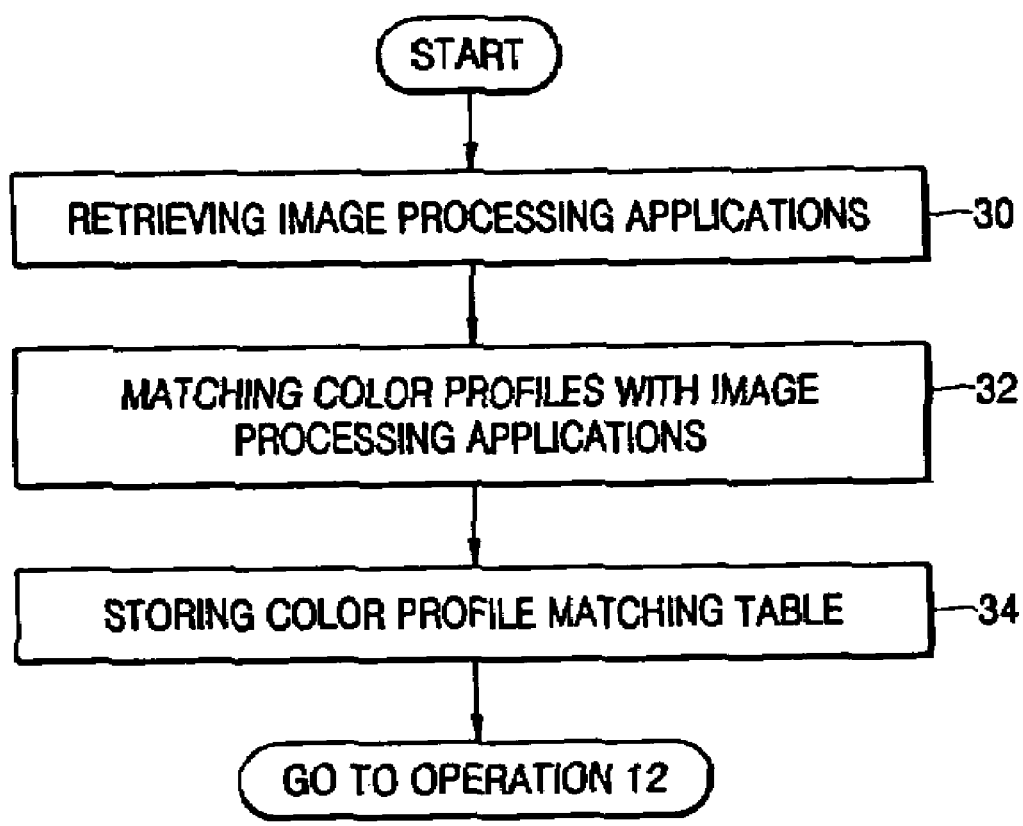
FIG. 2 is a flowchart of an operation of the method of FIG. 1.

Hereinafter, the operation 10 will be described in detail with reference to FIG. 2. FIG. 2 is a flowchart of the operation 10 of the method of FIG. 1. In operation 10, the image processing applications are retrieved, the color profiles match the corresponding ones of the image processing applications, and the color profile matching table is stored (operations 30~34).

Firstly, the image processing applications installed in a computer are retrieved (operation 30). Various image processing applications to process images may be installed in the computer in advance.

Next, an optimized image is formed using one of the color profiles matching the corresponding ones of the image processing applications, and the color profile matching table listing the color profiles matching the corresponding ones of the image processing applications is generated (operation 32). Each of the color profile is an optimized one corresponding to the image processing application. The optimized color profile can be empirically verified by printing or scanning. An example of the color profile matching table listing the color profiles matching the corresponding ones of the image processing applications is shown in Table 1.

TABLE 1

| Image Processing Application | Color Profile |
| --- | --- |
| PowerPoint ®, | SEC ML 1750 COLOR PROFILE 1 |
| PhotoShop ®, | SEC ML 1750 COLOR PROFILE 2 |
| PaintShop ®, | SEC ML 1750 COLOR PROFILE 3 |

As shown in Table 1, various image processing applications match color profiles in a one-to-one correspondence manner.

Next, the color profile matching table is stored in a predetermined storage unit in the computer (operation 34).

After the operation 10, in response to a request to form an image by a specific image processing application, it is determined whether or not a specific color profile matching the specific image processing application is listed in the color profile matching table (operation 12). For example, in response to a request to print an image processed with the Photoshop, it is determined whether or not a specific color profile matching the Photoshop is listed in the color profile matching table like Table 1.

If the specific color profile matching the specific image processing application is listed in the color profile matching table, image forming data is generated in accordance with the specific color profile (operation 14). Here, the image forming data is generated by converting the image processed with the image processing application into bitmap data having such a format that it can be analyzed by the image forming apparatus. For example, in a case where the request to print the image processed with the Photoshop is received, it is determined whether or not a specific color profile matching the Photoshop is listed in the color profile matching table like Table 1. As shown in Table 1, the optimized color profile matching the Photoshop is SEC ML 1750 COLOR PROFILE 2. Next, the image forming data corresponding to the image processed with the Photoshop is generated using the color profile SEC ML 1750 COLOR PROFILE 2.

If the specific color profile matching the specific image processing application is not listed in the color profile matching table, generating the image forming data in accordance with a general purpose color profile commonly used as the image processing applications (operation 16). For example, it is assumed that a request to print the image processed with the MS word, which is not listed in the color profile matching table, is received. Since the MS word is not listed in the color profile matching table as shown in Table 1, the image forming data in accordance with the general purpose color profile commonly used as the image processing applications is generated.

The image forming data generated in the operation 14 or 16 is transmitted to the image forming apparatus. The image forming data is converted into bitmap data, so that the image can be formed by the image forming apparatus. In particular, since the image forming data generated in the operation 14 is generated by using the optimized color profile matched with a specific image processing application, the image forming apparatus can obtain a high image quality. On the other hand, the image forming data generated in the operation 16 is generated using the general purpose color profile, the image quality formed using the image forming data formed in the operation 16 may be lower than that formed in the operation 14.

Now, an apparatus to generate image forming data using a color profile matching an image processing application according to an embodiment of the present general inventive concept will be described in detail with reference to the accompanying drawings.

Figure 3:
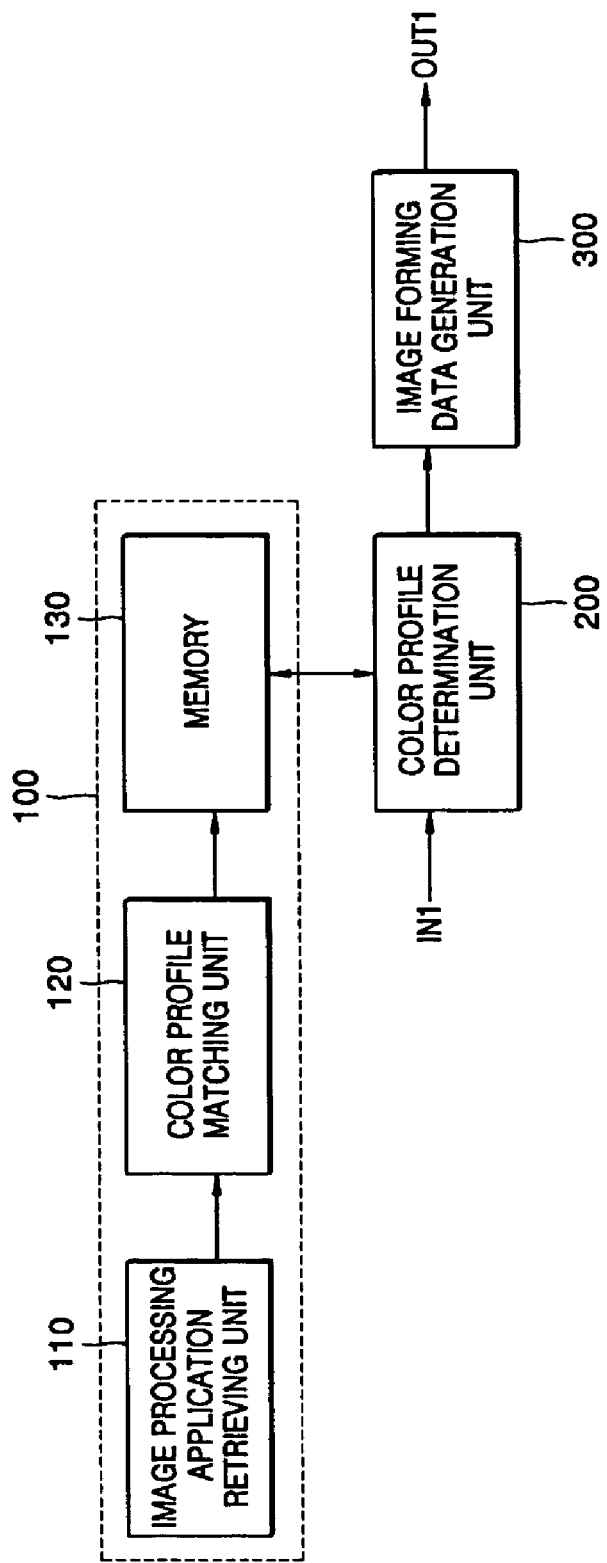
FIG. 3 is a block diagram of an apparatus to generate image forming data using a color profile matching an image processing application according to an embodiment of the present general inventive concept.

FIG. 3 is a block diagram of an apparatus to generate image forming data using a color profile matching an image processing application according to an embodiment of the present general inventive concept. The apparatus comprises a matching table generation unit 100, a color profile determination unit 200, and an image forming data generation unit 300.

The matching table generation unit 100 generates a color profile matching table listing the color profiles matching the corresponding ones of the image processing applications. As shown in Table 1, the matching table generation unit 100 generates the color profile matching table listing the color profiles matching the corresponding ones of the plurality of the image processing applications installed in a computer, and outputs the color profile matching table to the color profile determination unit 200.

More specifically, the matching table generation unit 100 comprises an image processing application retrieving unit 110, a color profile matching unit 120, and a memory 130.

The image processing application retrieving unit 110 retrieves the image processing applications installed in a computer. Fore example, the image processing application retrieving unit 110 retrieves the image processing applications such as PowerPoint®, PhotoShop®, and PaintShop®, shown in Table 1, and outputs the retrieved image processing applications to the color profile matching unit 120.

The color profile matching unit 120 matches the color profiles with the image processing applications in order to obtain an optimized image and generates the color profile matching table. For example, the color profile matching unit 120 matches the color profiles, such as SEC ML 1750 COLOR PROFILE 1, SEC ML 1750 COLOR PROFILE 2 and SEC ML 1750 COLOR PROFILE 3, with the image processing applications, such as PowerPoint, PhotoShop, and PaintShop, in order to form an optimized image and generates the color profile matching table shown in Table 1. The color profile matching unit 120 transmits the color profile matching table to the memory 130.

The memory 130 stores the color profile matching table transmitted from the color profile matching unit 120. In response to a command of the color profile determination unit 200, the memory 13 transmits the color profile matching table to the color profile determination unit 200.

In response to a request for forming an image processed with a specific image processing application, the color profile determination unit 200 determines whether or not a specific color profile matching the specific image processing application is listed in the color profile matching table. More specifically, if an image forming request signal to form an image by a specific image processing application is input though an input terminal IN1, the color profile determination unit 200 receives the color profile matching table and determines whether or not the specific color profile matching the specific image processing application is listed in the color profile matching table. The result of the determination is transmitted to the image forming data generation unit 300.

In response to the result of the determination of the color profile determination unit 200, the image forming data generation unit 300 generates image forming data in accordance with the specific color profile. More specifically, if a determination result that the specific color profile matching the specific image processing application is listed in the color profile matching table is received, the image forming data generation unit 300 generates the image forming data in accordance with the specific color profile. On the other hand, if a determination result that the specific color profile matching the specific image processing application is not listed in the color profile matching table is received, the image forming data generation unit 300 generates the image forming data in accordance with a general purpose color profile commonly used for the image processing applications. The image forming data generation unit 300 outputs the image forming data through an output terminal OU1.

The image forming data generated by the image forming data generation unit 300 is transmitted to an image forming apparatus (not shown) to form an image. The image forming apparatus converts the image forming data into bitmap image data to form a bitmap image. In particular, if the image forming data is generated using the optimized color profile matching the specific image processing application, the image forming apparatus can form the bitmap image having a high image quality.

According to the present invention, in the method and apparatus to generate image forming data using a color profile matching an image processing application, since an optimized color profile matching an image processing application is provided, it is possible to solve a problem in that a user must manually adjust a color profile to the corresponding image processing application to optimally print an image. In particular, it is possible for a user, who is not accustomed to a computer, to easily manage a color profile.

In addition, according to the embodiment of the present general inventive concept, it is possible to obtain an optimized image even in a case where the image processing applications are changed.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of generating image forming data, the method comprising:
   generating a color profile matching table listing color profiles matching corresponding ones of image processing applications;
   in response to a request to form an image by a specific image processing application, determining whether or not a specific color profile matching the specific image processing application is listed in the color profile matching table; and
   if the specific color profile matching the specific image processing application is listed in the color profile matching table, generating image forming data in accordance with the specific color profile so that the image forming data is used to form the image.

2. The method according to claim 1, wherein the generating of the color profile matching table comprises:
   retrieving the image processing applications installed in a computer;
   matching the color profiles with the image processing applications in order to form the image as an optimized image, and generating the color profile matching table; and
   storing the color profile matching table.

3. The method according to claim 1, further comprising:
   if the specific color profile matching the specific image processing application is not listed in the color profile matching table, generating the image forming data in accordance with a general purpose color profile commonly used as the image processing applications.

4. The method according to claim 1, wherein the generating of the image forming data comprises transmitting the image forming data to an image forming apparatus to print the image according to the image forming data.

5. The method according to claim 1, wherein the color profile matching table comprises a general purpose color profile, and the generating of the image forming data comprises selectively generating one of the general purpose color profile and the specific color profile upon determination of whether the specific color profile matching the specific image processing application is listed in the color profile matching table.

6. The method according to claim 1, wherein the generating of the color profile matching table and the generating of the image forming data comprise:
generating the color profile matching table in a computer which is connected to an image forming apparatus; and
generating the image forming data according to the specific color profile in the computer;
transmitting the image forming data to the image forming apparatus to print the image according to the image forming data received from the computer.

7. An apparatus to generate image forming data, comprising:
a matching table generation unit to generate a color profile matching table listing the color profiles matching corresponding ones of image processing applications;
a color profile determination unit to determine whether or not a specific color profile matching the specific image processing application is listed in the color profile matching table, in response to a request for forming an image by a specific image processing application; and
an image forming data generation unit to generate image forming data in accordance with the specific color profile, if the specific color profile matching the specific image processing application is listed in the color profile matching table so that the image is formed according to the specific color profile.

8. The apparatus according to claim 7, wherein the matching table generation unit comprises:
an image processing application retrieving unit to retrieve the image processing applications installed in a computer;
a color profile matching unit to match the color profiles with the corresponding ones of the image processing applications in order to form the image as an optimized image, and to generate the color profile matching table; and
a memory to store the color profile matching table.

9. The apparatus according to claim 7, wherein the image forming data generation unit generates the image forming data in accordance with a general purpose color profile commonly used as the image processing applications in response to a result of the retrieving of the color profile retrieving unit.

10. The apparatus according to claim 7, wherein the image forming data generation unit transmits the image forming data to an image forming apparatus to print the image according to the image forming data.

11. The apparatus according to claim 7, wherein the image forming data generation unit selectively generates one of a general purpose color profile and the specific color profile upon determination of whether the specific color profile matching the specific image processing application is listed in the color profile matching table.

12. The apparatus according to claim 7, wherein the matching table generation unit, the color profile determination unit, and the image forming data generation unit are installed in a computer which is connected to an image forming apparatus, and the image forming data is transmitted from the computer to the image forming apparatus so that the image is printed according to the image forming data corresponding to the specific color profile.

13. An apparatus to generate image forming data, comprising:
a memory to store a color profile matching table which comprising a list having color profiles matching corresponding ones of image processing applications;
a color profile determination unit to determine whether a specific image processing application exists as one of the image processing applications in the color profile matching table; and
an image forming data generation unit to generate image forming data according to one of a general purpose color profile and one of the color profiles corresponding to the one of the image processing applications according to a determination of whether the specific image processing application exists as the one of the image processing applications in the color profile matching table.

14. The apparatus according to claim 13, wherein the image forming data generation unit receives image date with the specific image processing application, and the image forming data generation unit processes the image data according to the one of the general purpose color profile and the one of the color profiles corresponding to the one of the image processing applications, to generate the image forming data.

15. The apparatus according to claim 13, wherein the color profile determination unit generates the general purpose color profile when the specific image processing application does not exist as the one of the image processing applications in the color profile matching table, and the image forming data generation unit processes the image data according to the general purpose color profile to generate the image forming data.

16. The apparatus according to claim 13, wherein the color profile determination unit generates the one of the color profiles when the specific image processing application exists as the one of the image processing applications in the color profile matching table, and the image forming data generation unit processes the image data according to the one of the color profiles, to generate the image forming data.

17. The apparatus according to claim 13, further comprising:
a matching table generation unit to retrieve the image processing applications, to match the color profiles with the corresponding ones of the image processing applications in order to form the image as an optimized image, and to generate the color profile matching table.

18. The apparatus according to claim 17, wherein the matching table generation unit, the memory, the color profile determination unit, and the image forming data generation unit are installed in a computer.

19. The apparatus according to claim 13, further comprising:
an image processing application retrieving unit to retrieve the image processing applications; and
a color profile matching unit to match the color profiles with the corresponding ones of the image processing applications in a color profile matching table, and to store the color profile matching table in the memory.

20. The apparatus according to claim 19, wherein the image processing application retrieving unit, the color profile matching unit, the memory, the color profile determination unit, and the image forming data generation unit are installed in a computer connected to an external image forming apparatus, and the computer transmits the image forming data to the external image forming apparatus so that the image forming apparatus converts the image forming data into bitmap image to form bitmap image to be printed on a printing medium.

21. The apparatus according to claim 13, wherein the color profile determination unit automatically determines whether the specific image processing application exists as the one of the image processing applications in the color profile matching table of the memory, and the image forming data generation unit automatically generates the image forming data according to one of a general purpose color profile and one of the color profiles corresponding to the one of the image processing applications.

* * * * *